(12) United States Patent
Sasaki

(10) Patent No.: US 6,433,960 B2
(45) Date of Patent: Aug. 13, 2002

(54) METHOD OF MANUFACTURING A MAGNETIC HEAD

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/805,186

(22) Filed: Mar. 14, 2001

Related U.S. Application Data (62) Division of application No. 09/280,812, filed on Mar. 30, 1999, now Pat. No. 6,260,256.

(30) Foreign Application Priority Data

Mar. 31, 1998 (JP) .......................................... 10-085935

(51) Int. Cl.[7] ................................................. G11B 5/17
(52) U.S. Cl. ..................................... 360/123; 360/126
(58) Field of Search ................................. 360/123, 126

(56) References Cited

U.S. PATENT DOCUMENTS

| | | | |
|---|---|---|---|
| 3,721,000 A | 3/1973 | Okamoto et al. | |
| 5,052,099 A | 10/1991 | Taguchi et al. | |
| 5,059,278 A | * 10/1991 | Cohn et al. ................. | 360/123 |
| 5,146,671 A | 9/1992 | Ogawa et al. | |
| 5,761,790 A | 6/1998 | Carr et al. | |
| 5,764,453 A | 6/1998 | Postma et al. | |
| 5,779,923 A | 7/1998 | Korunbi et al. | |
| 6,004,472 A | 12/1999 | Dorius et al. | |
| 6,076,252 A | 6/2000 | Sasaki | |

FOREIGN PATENT DOCUMENTS

| | | |
|---|---|---|
| JP | 63113812 A | 5/1988 |
| JP | 02230505 A | 9/1990 |
| JP | 06267776 A | 9/1994 |
| JP | 09-115111 | 5/1997 |

* cited by examiner

*Primary Examiner*—Robert S. Tupper
(74) *Attorney, Agent, or Firm*—Oliff & Berridge, PLC

(57) ABSTRACT

A thin film magnetic head having a short magnetic path length by reducing a spacing between successive coil windings of a thin film coil to improve flux rising time, NLTS and overwrite characteristics, is efficiently manufactured on a mass scale by forming a write gap layer on a first magnetic layer having a pole portion of the thin film magnetic head opposing to a magnetic record medium, forming, on the write gap layer, a seed layer made of a material which can be easily removed by a reactive ion etching such as Ti—TiN, Mo, W, Al, Ti—TiW, $MoSi_2$ and $WSi_2$, forming coil windings of the thin film coil by electroplating a copper after forming a photoresist having coil-shaped openings formed therein, removing the photoresist, removing selectively the exposed seed layer by the reactive ion etching using a fluorine or chlorine gas, and covering the coil windings with a photoresist. After forming a second layer thin film coil in a similar manner, a second magnetic layer is formed in a given pattern, and then a whole surface is covered with an overcoat layer.

9 Claims, 10 Drawing Sheets

FIG_1  PRIOR ART

FIG_2  PRIOR ART

FIG_3  PRIOR ART

FIG_6
PRIOR ART

FIG_9

FIG_10

FIG_11

FIG_12

FIG_13

FIG_14

FIG_15

FIG_16

FIG_17

FIG_18

FIG_19

FIG. 20

METHOD OF MANUFACTURING A MAGNETIC HEAD

This is a Division of application Ser. No. 09/280,812 filed Mar. 30, 1999 now U.S. Pat. No. 6,260,256. The entire disclosure of the prior application is hereby incorporated by reference herein in its entirety.

BACKGROUND OF THE INVENTION

1. Field of the Invention

The present invention relates to a thin film magnetic head and a method of manufacturing the same, and more particularly to an inductive type writing magnetic head and a method of manufacturing the same.

2. Description of the Related Art

Recently a surface recording density of a hard disc device has been improved, and it has been required to develop a thin film magnetic head having an improved performance accordingly. In order to satisfy such a requirement, there has been proposed a magnetic head, in which a reading or reproducing magnetic head and a writing or recording magnetic head are stacked one on the other. In such a magnetic head, an inductive type thin film magnetic head is used as the writing head and a magnetoresistive type thin film magnetic head is used as the reading head. As the magnetoresistive type magnetic head, a magnetoresistive element having a conventional anisotropic magnetoresistive (AMR) effect has been widely utilized. There has been further developed a magnetoresistive element utilizing a giant magnetoresistive (GMR) effect having a resistance change ratio higher than the normal anisotropic magnetoresistive effect by several times.

In the present specification, these AMR and GMR elements are termed as a magnetoresistive reproducing element or MR reproducing element.

By using the AMR element, a very high surface recording density of several gigabits per a unit square inch can be realized, and a surface recording density can be further increased by using the GMR element. By increasing a surface recording density in this manner, it is possible to realize a hard disc device which has a very large storage capacity of more than 10 gigabytes and is small in size.

A height of a magnetoresistive reproducing element (MR Height: MRH) is one of factors which determine a performance of a reproducing head including a magnetoresistive reproducing element. This MR height MRH is a distance measured from an air bearing surface on which the magnetoresistive reproducing element exposes to an edge of the element remote from the air bearing surface. During a manufacturing process of the magnetic head, a desired MR height MRH can be obtained by controlling an amount of polishing the air bearing surface.

As stated above, a performance of the reproducing head may be improved by utilizing the GMR element. Then, a performance of a recording head is required to be improved accordingly. In order to increase a surface recording density, it is necessary to make a track density on a magnetic record medium as high as possible. For this purpose, a width of a pole portion and write gap at the air bearing surface has to be reduced to a value within a range from several microns to several submicrons. In order to satisfy such a requirement, the semiconductor manufacturing process has been utilized in manufacturing the thin film magnetic head.

One of factors determining a performance of the inductive type thin film writing magnetic film is a throat height (TH). This throat height TH is a distance of a pole portion measured from the air bearing surface to an edge of an insulating layer which serves to separate a thin film coil from the air bearing surface. It has been required to shorten this distance as small as possible. This distance can be also determined by controlling an amount of polishing the air bearing surface.

In order to improve a performance of the inductive type thin film writing magnetic head, it has been proposed to shorten a length of portions of bottom pole and top pole surrounding the thin film coil (in this specification, said length is called a magnetic path length).

FIGS. 1–8 are cross sectional views showing successive steps of a known method of manufacturing a conventional typical combination type thin film magnetic head including a GMR element, said cross sectional views being cut along a plane perpendicular to the air bearing surface. In this example, the combination type thin film magnetic head is constructed by stacking an inductive type writing thin film magnetic head on a magnetoresistive type reading thin film magnetic head.

Figure 1:
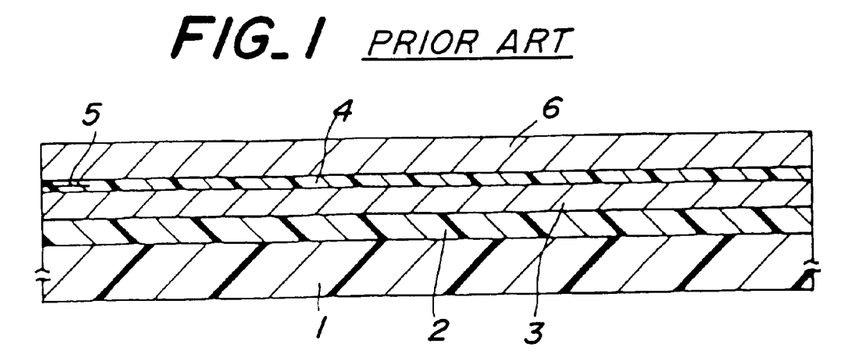
FIGS. 1–8 are cross sectional views showing successive steps of manufacturing a known thin film magnetic head.

At first, as illustrated in FIG. 1, on a substrate 1 made of a non-magnetic material such as AlTiC, is deposited an insulating layer 2 made of alumina ($Al_2O_3$) and having a thickness of about 5–10 $\mu$m, a bottom shield layer 3 constituting a magnetic shield for the MR reproducing magnetic head and having a thickness of about 3–4 $\mu$m is deposited on the insulating layer, and then a GMR layer 5 having a thickness not larger than several tens nm is formed such that the GMR layer is embedded in a shield gap layer 4. On the shield gap layer 4, is further deposited a magnetic layer 6 made of a permalloy and having a thickness of 3–4 $\mu$m. This magnetic layer 6 serves not only as an upper shield layer for magnetically shielding the GMR reproducing element together with the above mentioned bottom shield layer 3, but also as a bottom magnetic layer of the inductive type writing thin film magnetic head. Here, for the sake of explanation, the magnetic layer 6 is called a first magnetic layer, because this magnetic layer constitutes one of magnetic layers forming the writing thin film magnetic head.

Figure 2:
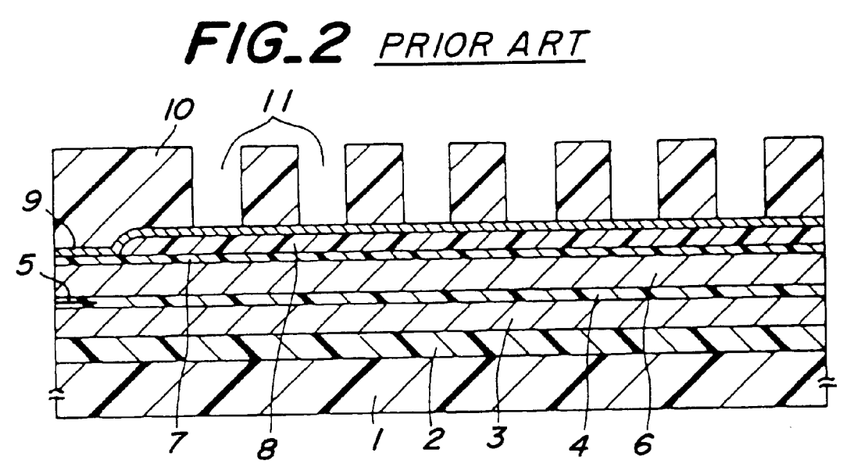

Next, as shown in FIG. 2, on the first magnetic layer 6, is formed a write gap layer 7 made of a nonmagnetic material such as alumina with a thickness of about 200 nm. A photoresist layer 8 for determining a throat height TH is formed on the write gap layer 7 except for a portion which will constitute a pole portion, and then a thin copper layer 9 having a thickness of about 100 nm is deposited on a whole surface by sputtering. The copper layer 9 will serve as a seed layer for a process of forming a thin film coil by an electroplating, and thus this layer is also called a seed layer. On this seed layer 9, is formed a thick photoresist layer 10 having a thickness of 3 $\mu$m, and openings 11 are formed in the photoresist layer such that the seed layer 9 is exposed in the openings. A height of the openings is 2 $\mu$m which is identical with a thickness of the photoresist layer and a width of the openings is also 2 $\mu$m.

Figure 3:
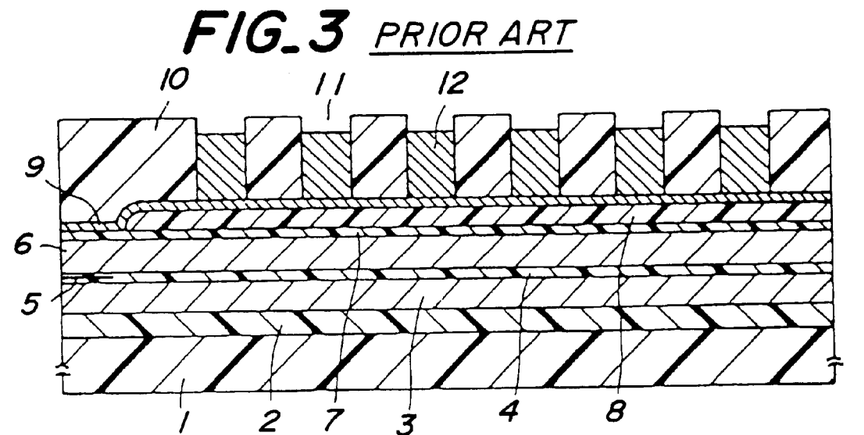

Next, an electroplating of copper is performed using an electroplating liquid of a copper sulfate to form coil windings 12 of a first thin film coil layer within the openings 11 formed in the photoresist layer 10, said coil windings having a thickness of 2–3 $\mu$m. A thickness of the coil windings 12 is preferably smaller than a depth of the openings 11.

Figure 4:
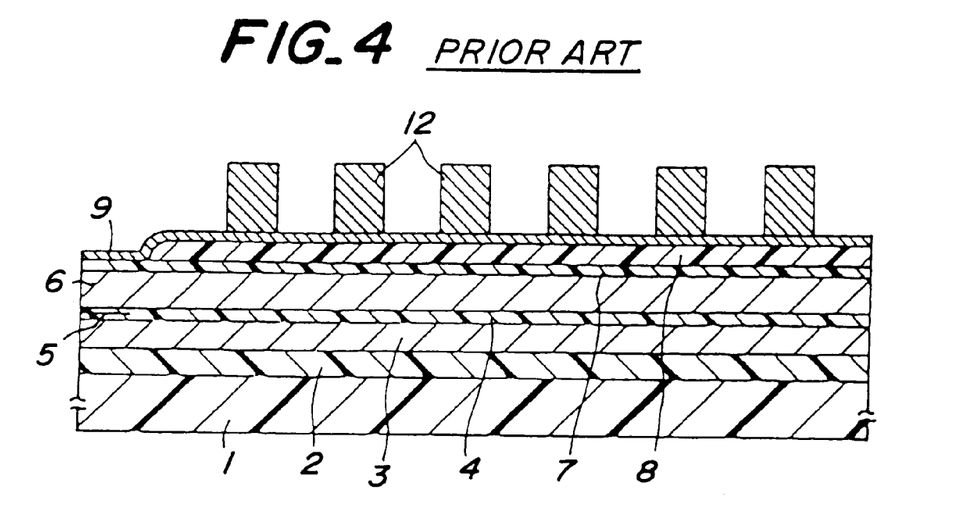
Figure 5:
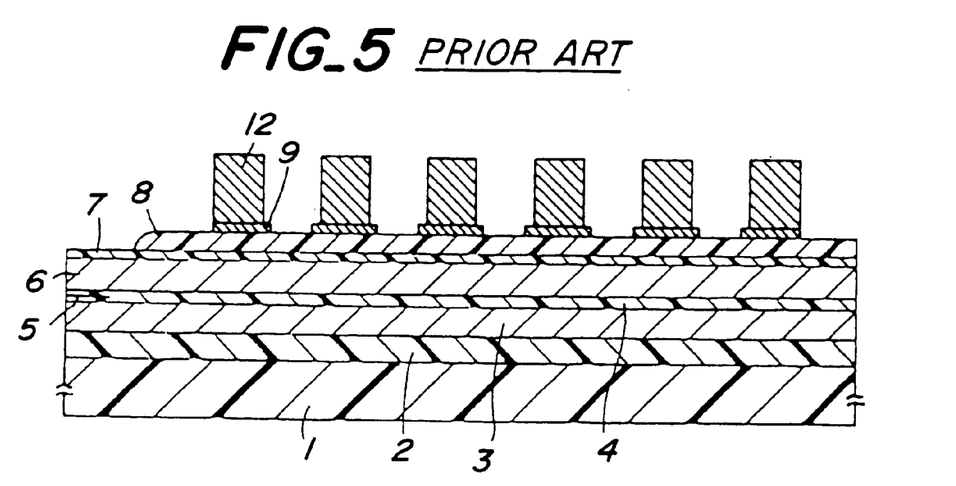

Then, as depicted in FIG. 4, after removing the photoresist layer 10, a milling process is conducted with an argon ion beam to remove the seed layer 9 as shown in FIG. 5 such that the coil windings 12 are separated from each other to form a single body of a coil. During the ion beam milling, in order to avoid that a part of the seed layer 9 situating underneath the bottoms of the coil windings 12 is remained to extend from the thin film coil, the ion beam milling is performed with an incident angle of 5–10°. When the ion beam milling is carried out with substantially upright angles, a material of the seed layer 9 which is spread by an impact of the ion beam is liable to be adhered to surroundings. Therefore, a distance between successive coil windings 12 has to be large.

Figure 6:
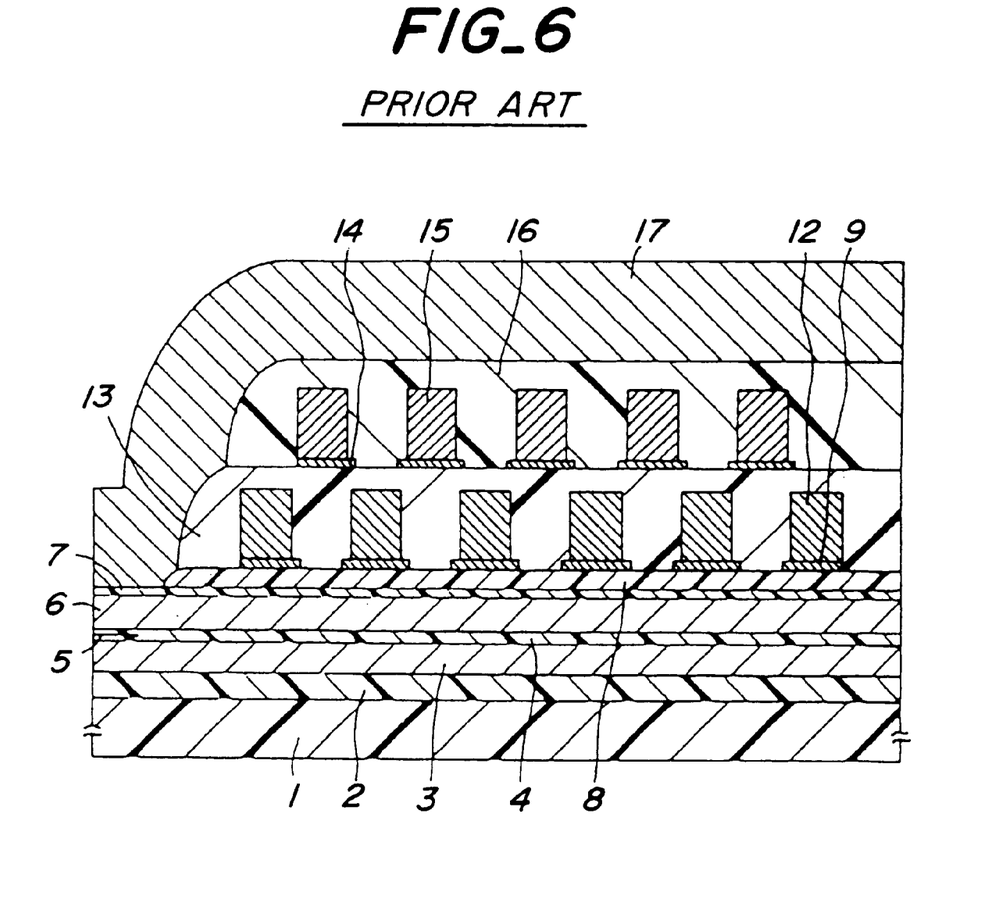

Next, as illustrated in FIG. 6, a photoresist layer 13 is formed such that the coil windings 12 of the first thin film coil layer are covered with this photoresist layer, and after polishing a surface to be flat, coil windings 15 of a second thin film coil layer is formed on a seed layer 14 by the same process as that described above. After forming a photoresist layer 16, a second magnetic layer 17 made of a permalloy is formed to have a thickness of 3–7 $\mu$m, said second magnetic layer constituting a top pole.

Figure 7:
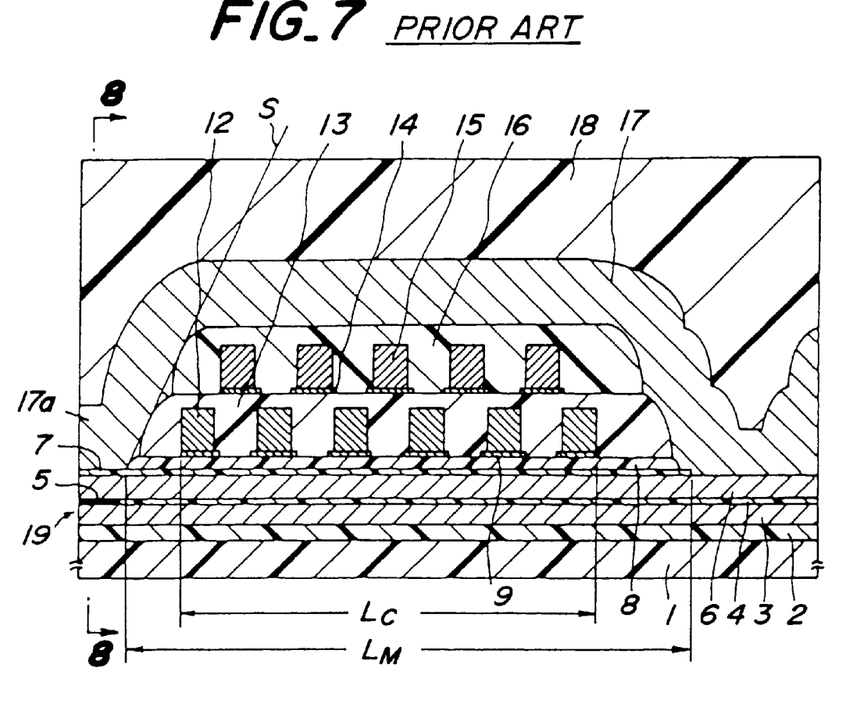
Figure 8:
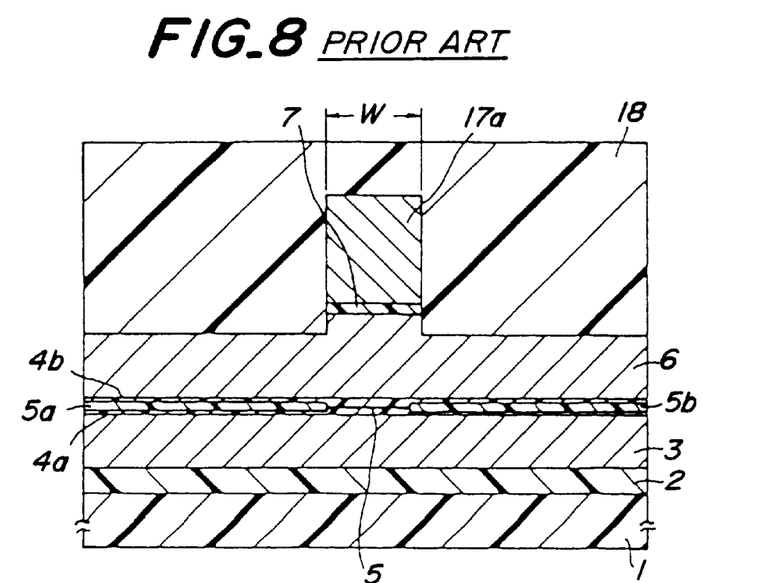

Next, as shown in FIGS. 7 and 8, the write gap layer 7 and a surface of the first magnetic layer 6 are etched to form a trim structure, while a pole portion of the second magnetic layer 17 is utilized as an etching mask. Then, an overcoat layer 18 made of alumina is formed on a whole surface. It should be noted that FIG. 8 is a cross sectional view cut along a line 8—8 in FIG. 7. In FIG. 8, there are shown first and second shield gap layers 4a and 4b constituting the shield gap layer 4 and conduction layers 5a and 5b for providing an electrical connection to the GMR element.

In an actual manufacturing process of the thin film magnetic head, after forming a number of the above mentioned structures on a single wafer, the wafer is divided into bars each including a plurality of thin film magnetic heads aligned along the bar, and a side wall of the bar is polished to obtain the air bearing surfaces 19 (refer to FIG. 7) of the magnetic heads. During the formation of the air bearing surface 19, the GMR layer 5 is also polished to obtain a combination type thin film magnetic head having desired throat height and MR height. Furthermore, in an actual process, contact pads for establishing electrical connections to the thin film coils 12, 15 and GMR reproducing element are formed. But these contact pads are not shown in the drawings.

Moreover, an apex angle $\theta$ between a straight line S connecting side edges of the photoresist layers 8, 13 and 16 on a side of the air bearing surface 19 and a surface plane of the substrate as shown in FIG. 7 is an important factor for determining a property of the thin film magnetic head together with the throat height and MR height.

Further, since a track width on a magnetic record medium is determined by a width W of the trim structure formed by a pole portion 6a of the first magnetic layer 6 and a pole portion 17a of the second magnetic layer 17 shown in FIG. 8, it is necessary to make said width W as small as possible in order to realize a high surface recording density.

In the known combination type thin film magnetic head manufactured by the above explained process, there is a problem in miniaturizing the inductive thin film writing magnetic head. That is to say, it has been known to improve characteristics such as flux rise time, non-linear transition shift (NLTS) and over write by reducing the magnetic path length $L_M$ which is a length of portions of the first magnetic layer 6 and second magnetic layer 17 which surround the coil windings 12 and 15 of the thin film coil as illustrated in FIG. 7. In order to reduce the magnetic path length $L_M$, it is necessary to shorten a coil width $L_C$ of a portion of the thin film coil 12, 15 which surrounds the first and second magnetic layers 6 and 17. However, in the known thin film magnetic head, the coil width $L_C$ could not be shortened due to the following reasons.

In order to shorten the coil width $L_C$ in the known thin film magnetic head, it is necessary to decrease a width of respective coil windings as well as to reduce a width of a spacing between successive coil windings. However, a reduction in a width of the coil winding is limited due to a fact that a resistance of the coil winding should be low. That is to say, although a coil winding is made of a copper having a low resistance, a height of a coil winding is limited to 2–3 $\mu$m, and thus a width of the coil winding could not be smaller than 1.5 $\mu$m. Therefore, in order to shorten the coil width $L_C$, it is necessary to reduce a spacing between successive coil windings.

However, in the known thin film magnetic head, a spacing between adjacent coil windings 12, 15 could not be shortened due to the following reasons.

As stated above, the coil windings 12, 15 are formed by the electroplating of copper, in which the seed layer 9 having a thickness of 100 nm is formed for uniformly depositing a copper within the openings 11 formed in the photoresist 10 over a whole surface of a wafer, and then the coil windings 12, 15 are formed by selectively depositing a copper within the openings 11 in which the seed layer is exposed. After that, the seed layer 9 is selectively removed for separating respective coil windings. Upon removing the seed layer 9, an ion milling, for instance an argon ion milling is carried out while the coil windings 12, 15 are used as a mask.

Here, in order to remove the seed layer 9 between successive coil windings 12, 15, it is preferable to conduct the ion milling from a direction perpendicular to the substrate surface. However, when the ion milling is effected from such a direction, copper debris might adhere to side walls of the coil windings and successive coil windings might not be isolated sufficiently. In order to avoid such a problem, in the known thin film magnetic head, a spacing between successive coil windings could not be shortened.

Furthermore, in order to solve the above problem, an ion milling may be performed with an incident angle of 5–10°. Then, an ion beam could not be sufficiently made incident upon shadow portions of the photoresist 10 and the seed layer 9 might be remained partially. In this manner, in order to avoid the degradation of the insulation between successive coil windings 12, 15, a spacing between adjacent coil windings could not be shortened. Therefore, in the known thin film magnetic head, a spacing between successive coil windings has to be wider such as 2–3 $\mu$m and could not be further reduced.

Moreover, in the known thin film magnetic head, a reference position for a throat height TH, that is a throat height zero position is given by the photoresist layer 8. After forming the first thin film coil layer 12, the photoresist layer 8 is also etched by the etching process for selectively removing the seed layer 9. Then, an edge which defines the throat height zero position might be retarded. In this manner, it is impossible to attain a thin film magnetic head having a desired throat height which follows accurately a designed value, and this is one of causes for decreasing a manufacturing yield.

In order to improve the NLTS property of the thin film magnetic head, it is considered to increase the number of coil windings of the thin film coil. However, in order to increase the number of coil windings, it would be necessary to increase the number of layers of the thin film coil such as four or five layers. Then, an apex angle might be too large and it is impossible to achieve the narrow track. In order to restrict an apex angle to a given value, the number of the coil layers has to be restricted to three, preferable two. Then, the number of coil windings could not be increased in the known thin film magnetic head.

SUMMARY OF THE INVENTION

The present invention has for its object to provide an inductive type thin film magnetic head, in which the above mentioned problems could be solved by reducing a spacing between successive coil windings to decrease a coil width $L_C$, and as a result thereof a magnetic path length $L_M$ could be decreased to improve characteristics of the thin film magnetic head.

It is another object of the invention to provide a method of manufacturing the thin film magnetic head having the above mentioned improved characteristics in an easy and accurate manner.

According to the invention, a thin film magnetic head comprises:
- a first magnetic layer having a pole portion which is opposed to a magnetic record medium;
- a second magnetic layer having a pole portion which constitutes an air bearing surface together with said pole portion of the first magnetic layer and being magnetically coupled with said first magnetic layer at a portion remote from the air bearing surface;
- a write gap layer made of a non-magnetic material and being interposed at least between said pole portion of the first magnetic layer and said pole portion of the second magnetic layer;
- a thin film coil consisting of one or more thin film coil layers and having a portion which is arranged between said first and second magnetic layers in an electrically insulated and isolated manner; and
- a substrate supporting said first and second magnetic layers, gap layer and thin film coil;
- wherein a coil winding of said thin film coil includes an electroplating seed layer made of a material which can be easily removed by a reactive ion etching and a coil body made of an electrically conductive material deposited on a surface of said seed layer remote from the air bearing surface.

According to the invention, a method of manufacturing a thin film magnetic head comprising
- a first magnetic layer having a pole portion which is to be opposed to a magnetic record medium;
- a second magnetic layer having a pole portion which constitutes an air bearing surface together with said pole portion of the first magnetic layer and being magnetically coupled with said first magnetic layer at a portion remote from the air bearing surface;
- a write gap layer made of a non-magnetic material and being interposed at least between said pole portion of the first magnetic layer and said pole portion of the second magnetic layer;
- a thin film coil consisting of one or more thin film coil layers and having a portion which is arranged between said first and second magnetic layers via electrically insulating layers; and
- a substrate supporting said first and second magnetic layers, gap layer and thin film coil;
- wherein a step of forming said thin film coil comprises:
- a step of forming a first insulating layer to be supported by said substrate;
- a step of forming an electroplating seed layer on a surface of said first insulating layer;
- a step of forming a photoresist layer on said seed layer, said photoresist layer having a coil-shaped recess formed therein;
- a step of performing an electroplating using said photoresist layer as a mask to form coil windings on an exposed surface of said seed layer at a bottom of said recess;
- a step of removing a portion of the seed layer remained between the coil windings by means of a reactive ion etching after removing the photoresist layer; and
- a step of forming a second insulating layer to cover said coil windings.

In the thin film magnetic head and the method of manufacturing the same according to the invention, said seed layer is made of a material which can be easily removed by the reactive ion etching, and therefore the seed layer can be removed in a sufficiently satisfactory manner although a spacing between successive coil windings is small. That is to say, a spacing between successive coil windings can be not larger than 1.5 μm, particularly not lager than 0.8–1.5 μm. When a spacing between successive coil windings is smaller than 0.8 μm, the seed layer might not be removed sufficiently within a short time period. Further, if a spacing between successive coil windings is not less than 1.5 μm, a merit of making the magnetic path length shorter could not be attained. According to the invention, by setting a spacing between successive coil windings to 0.8–1.5 μm, the magnetic path length can be shorted by 60–75% of the known magnetic path length without reducing a width of the coil windings, and the performance of the inductive type thin film magnetic head can be improved very much.

Furthermore, the electrically conductive material deposited on the seed layer by the electroplating is preferably made of a copper. In this case, in order to unify a thickness of the copper layer and to prevent the copper layer from being pealed off, it is preferable that the seed layer is consisting of a seed layer body made of a material selected from the group consisting of Ti—TiN, Mo, W, Al, Ti—TiW, $MoSi_2$ and $WSi_2$, and a very thin copper layer formed on a surface of the seed layer body remote from the substrate. In this case, since the copper layer may be formed to have an extremely small thickness, the copper layer may be easily removed by the sputter etching using an argon gas, and then the seed layer body may be removed by the reactive ion etching using a fluorine or chlorine gas.

DESCRIPTION OF THE PREFERRED EMBODIMENT

FIGS. 9–19 show successive steps of an embodiment of the method of manufacturing an embodiment of the thin film magnetic head according to the invention. In the present embodiment, a combination type thin film magnetic head having a magnetoresistive type thin film magnetic head and an inductive type thin film magnetic head stacked one on the other in this order is to be manufactured.

Figure 9:
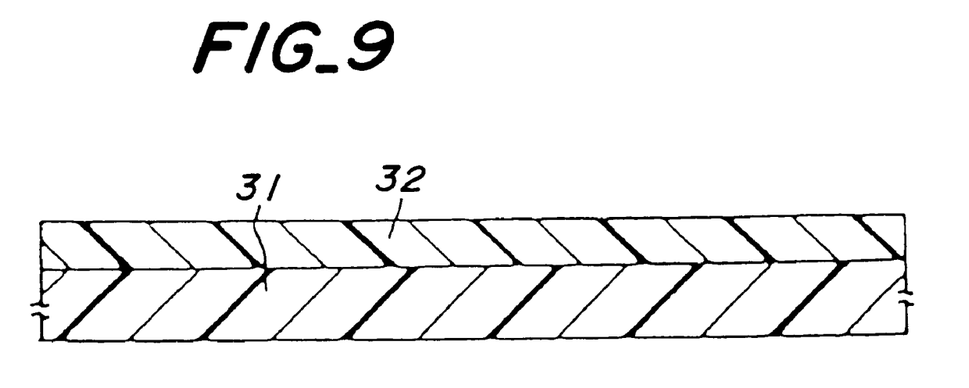
FIGS. 9–19 are cross sectional views representing successive steps of an embodiment of the thin film magnetic head manufacturing method according to the invention.

At first, as shown in FIG. 9, on a substrate 31 made of AlTiC, is deposited an insulating layer 32 made of an alumina and having a thickness of about 5 μm.

Figure 10:
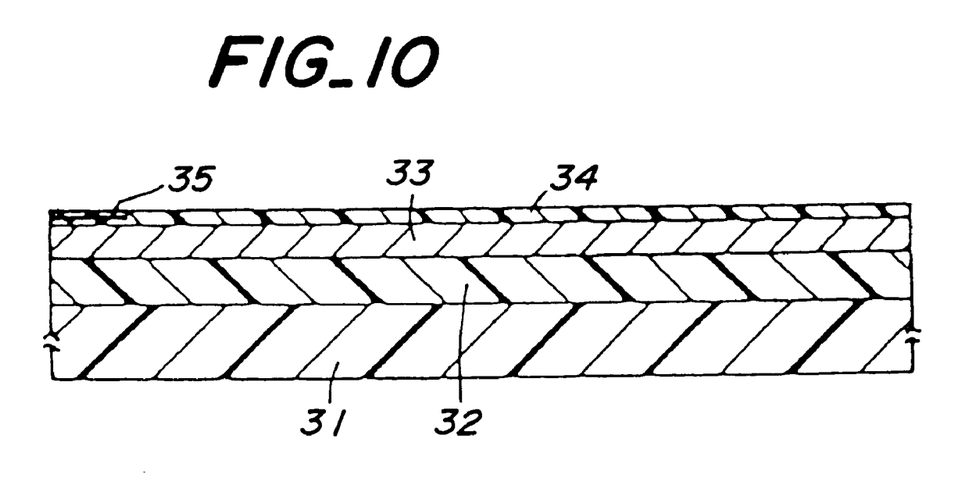

Next, as illustrated in FIG. 10, a lower shield layer 33 serving a magnetic shield for protecting an MR reproducing head from an external magnetic field is deposited to have a thickness of 2–3 μm, a lower shield gap layer made of an alumina is formed to have a thickness of 0.1 μm and a GMR layer 35 constituting a GMR reproducing element is formed to have a desired pattern by means of a highly precise mask alignment, and then an upper shield gap layer having a thickness of 0.1 μm is formed. In the drawing, the lower and upper shield gap layers are denoted as a shield gap layer 34.

Figure 11:
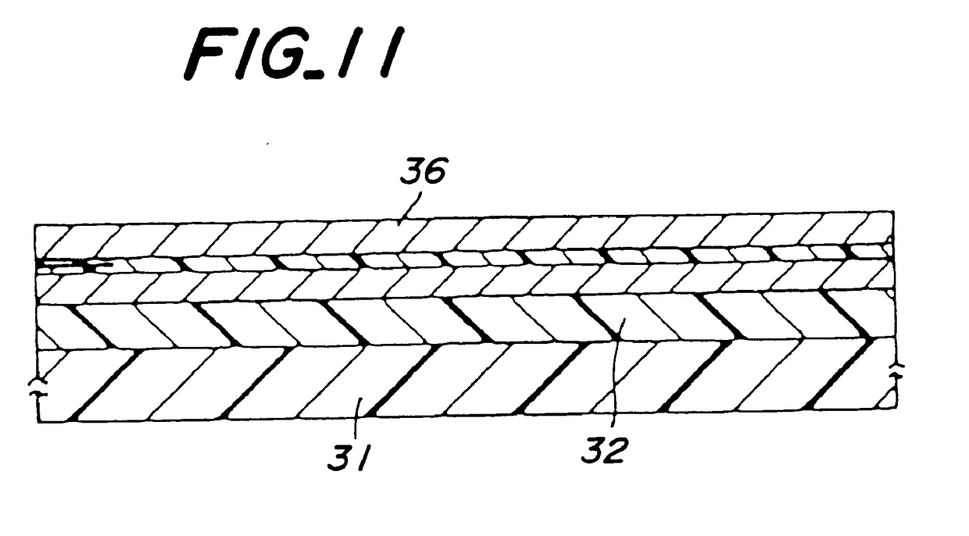

After that, after forming an electrically conductive layer not shown for forming an electrical connection to the GMR layer 5, a first magnetic layer 36 made of a permalloy is formed to have a thickness of 2–3 μm as illustrated in FIG. 11.

Figure 12:
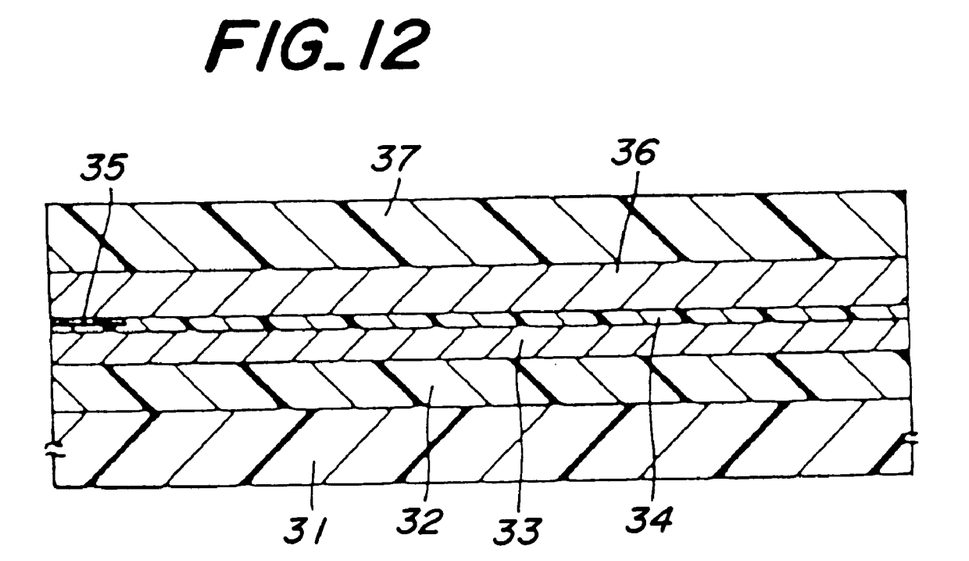
Figure 13:
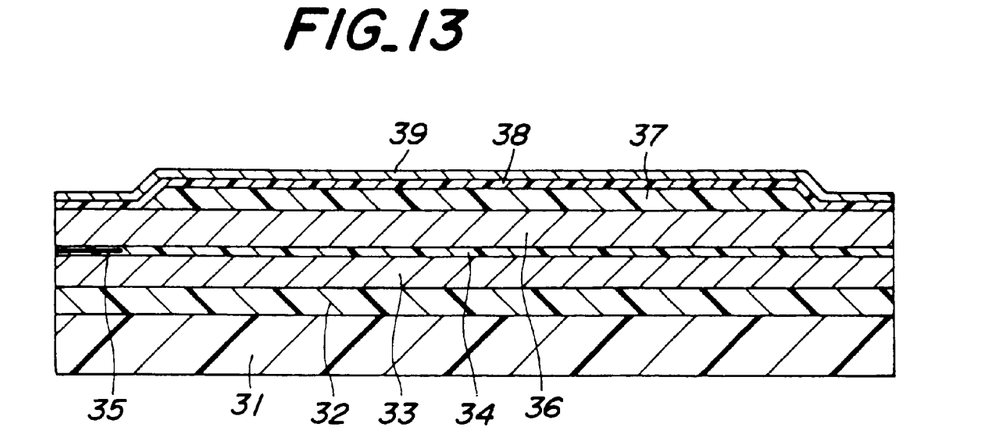

Then, as depicted in FIG. 12, on the first magnetic layer 36 is formed a silicon oxide layer 37 by sputtering with a thickness of 3–4 μm, said silicon oxide film constituting a first insulating layer in a later process. After that, the silicon oxide layer 37 is subjected to a reactive ion etching process using an etching gas such as $BCl_3$, $Cl_2$, $CF_4$ and $SF_4$ to form an edge defining a throat height zero reference position, while a photoresist having a given pattern is used as a mask. Next, after removing the photoresist, write gap layer 38 made of alumina is formed with a thickness of 0.2–0.3 μm, and a seed layer 39 made of Ti—TiN is formed on the write gap layer with a thickness of 0.05–0.1 82 m as depicted in FIG. 13.

Figure 14:
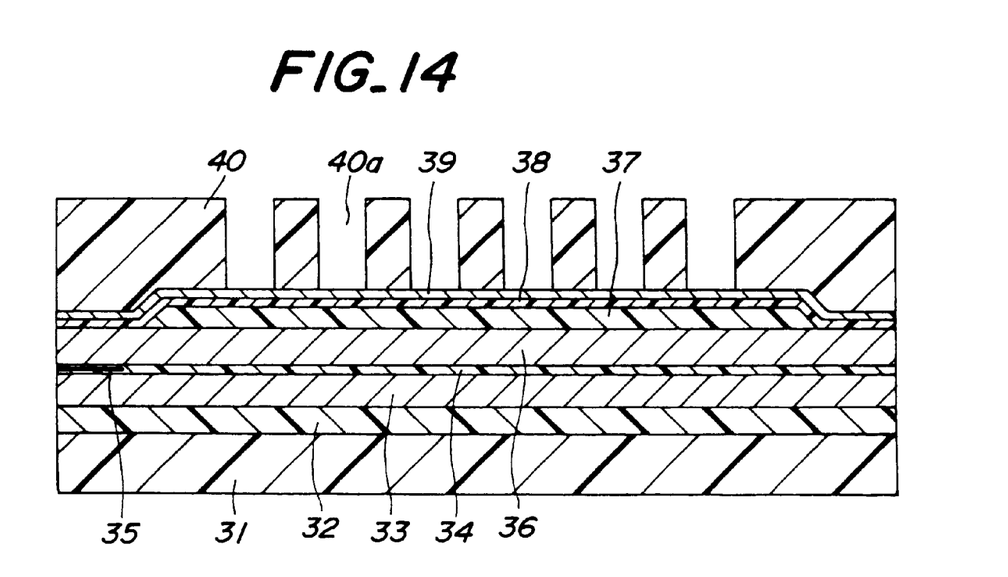

Then, as shown in FIG. 14, a photoresist 40 is formed on the seed layer 39, and a coil-shaped opening 40a to expose the seed layer in the bottom of the opening.

Figure 15:
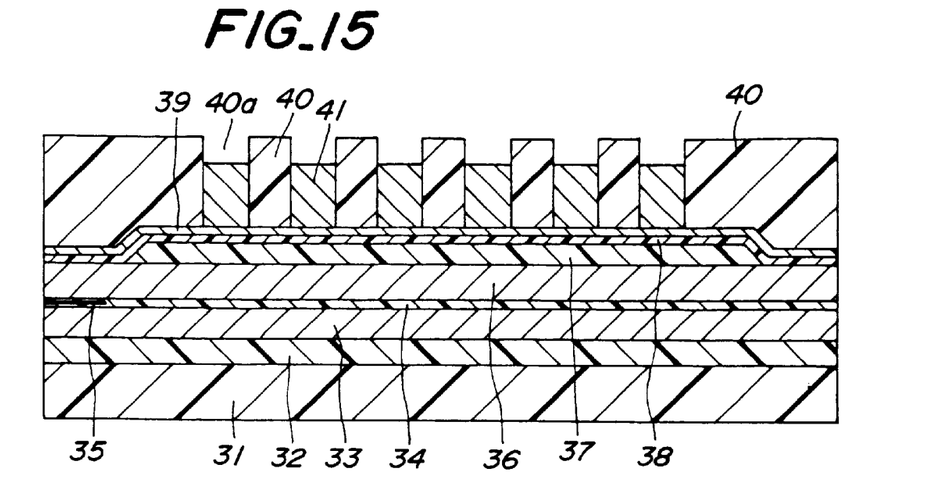
Figure 16:
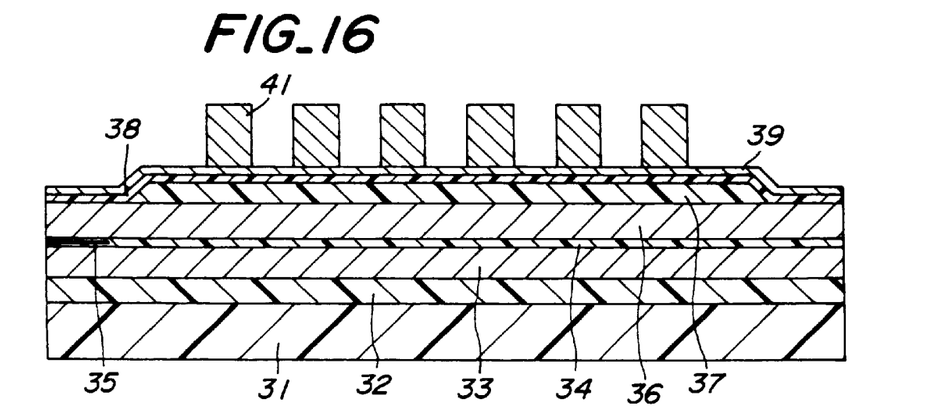

Subsequently, a copper is deposited in the opening 40a by the electroplating method with a copper sulfate solution, while the seed layer 39 is used as an anode to form a copper layer 41 constituting coil windings of a thin film coil as illustrated in FIG. 15, and then the photoresist 40 is removed as shown in FIG. 16. The coil windings 41 have a height of 2–3 μm and a width of 1.5–2.0 μm, and therefore the coil windings have a sufficiently low resistance. Further, a spacing between successive coil windings 41 is 0.8–1.5 μm, which is about 40–75% of a spacing between successive coil windings of the conventional thin film coil, and thus the magnetic path length can be shortened accordingly.

Figure 17:
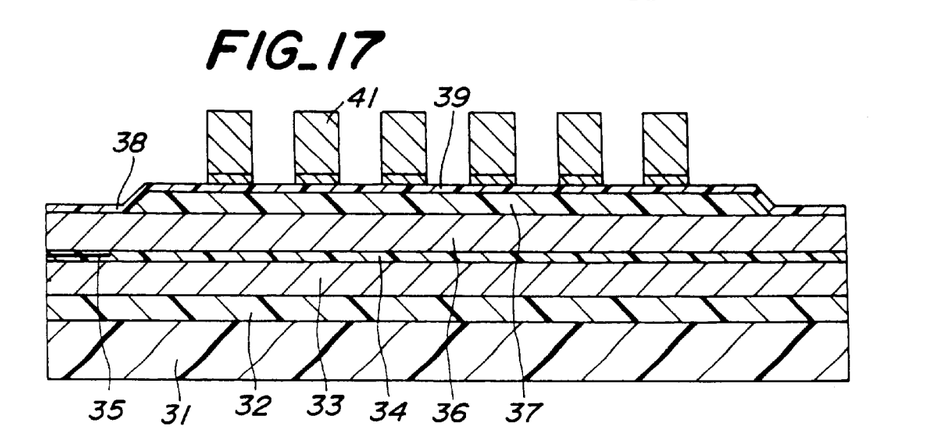

Next, as illustrated in FIG. 17, the exposed seed layer 39 is selectively removed by the reactive ion etching using a fluorine gas. As stated above, since the seed layer 39 is made of a material which can be easily removed by the reactive ion etching, although a spacing between successive coil windings 41 is small, the seed layer can be easily removed by performing the upright ion etching. In this manner, the coil windings consisting of the seed layer 39 and the copper layer 41 formed on the seed layer by the electroplating can be obtained. A height of the coil windings 39, 41 is 2–3 μm and a width of 1.5–2.0 μm, and thus have a sufficiently low resistance. Furthermore, a spacing between successive coil windings is 0.8–1.5 μm, which amounts to 40–75% of a spacing between successive coil windings of the known thin film magnetic head, and the magnetic path length can be shortened accordingly.

Figure 18:
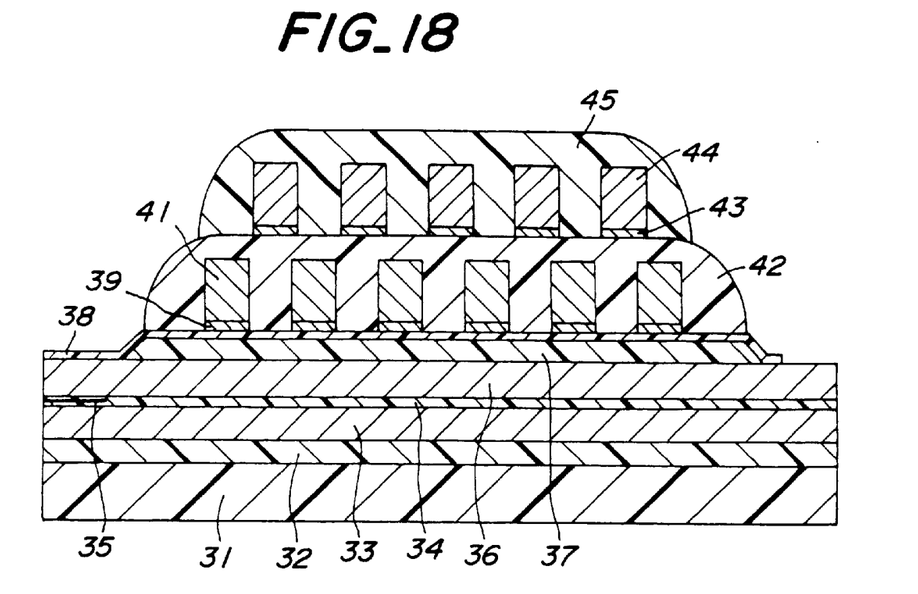

Next, after covering the coil windings 39, 41 with a photoresist 42, coil windings of a second layer thin film coil are formed by a seed layer 43 and a copper layer 44, and then the coil windings are covered with a photoresist 45 as shown in FIG. 18.

Figure 19:
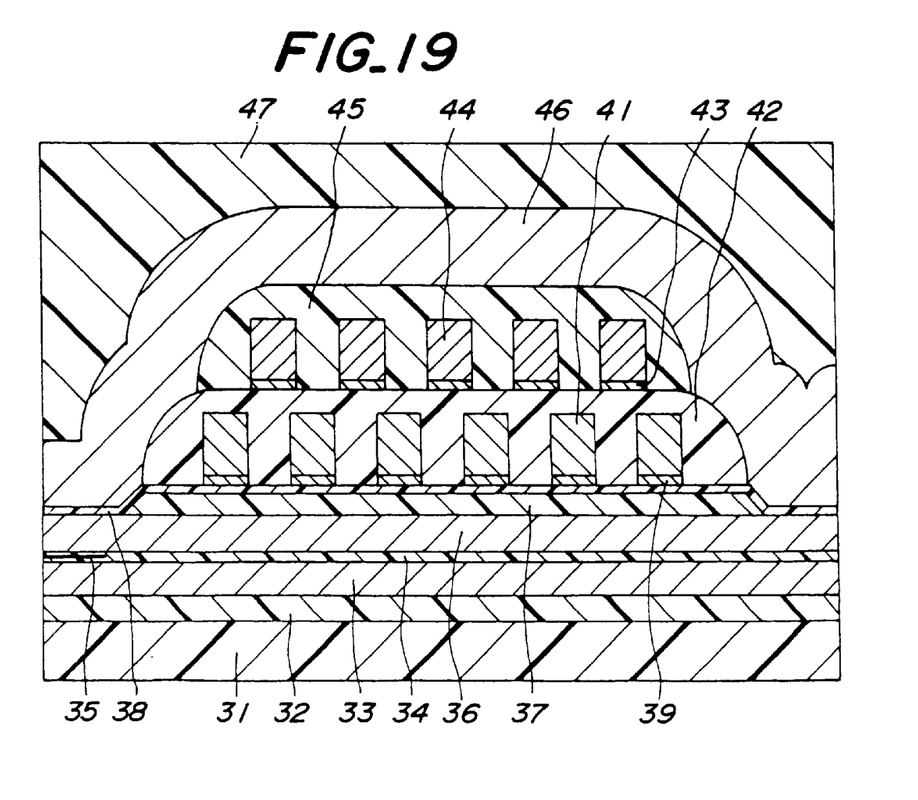

Furthermore, as illustrated in FIG. 19, a second magnetic layer 46 made of permalloy is formed to constitute the upper pole, and then an overcoat layer 47 made of alumina is formed. The second magnetic layer 46 is brought into contact with the first magnetic layer 36 at a portion remote from the air bearing surface to form a closed magnetic path.

Figure 20:
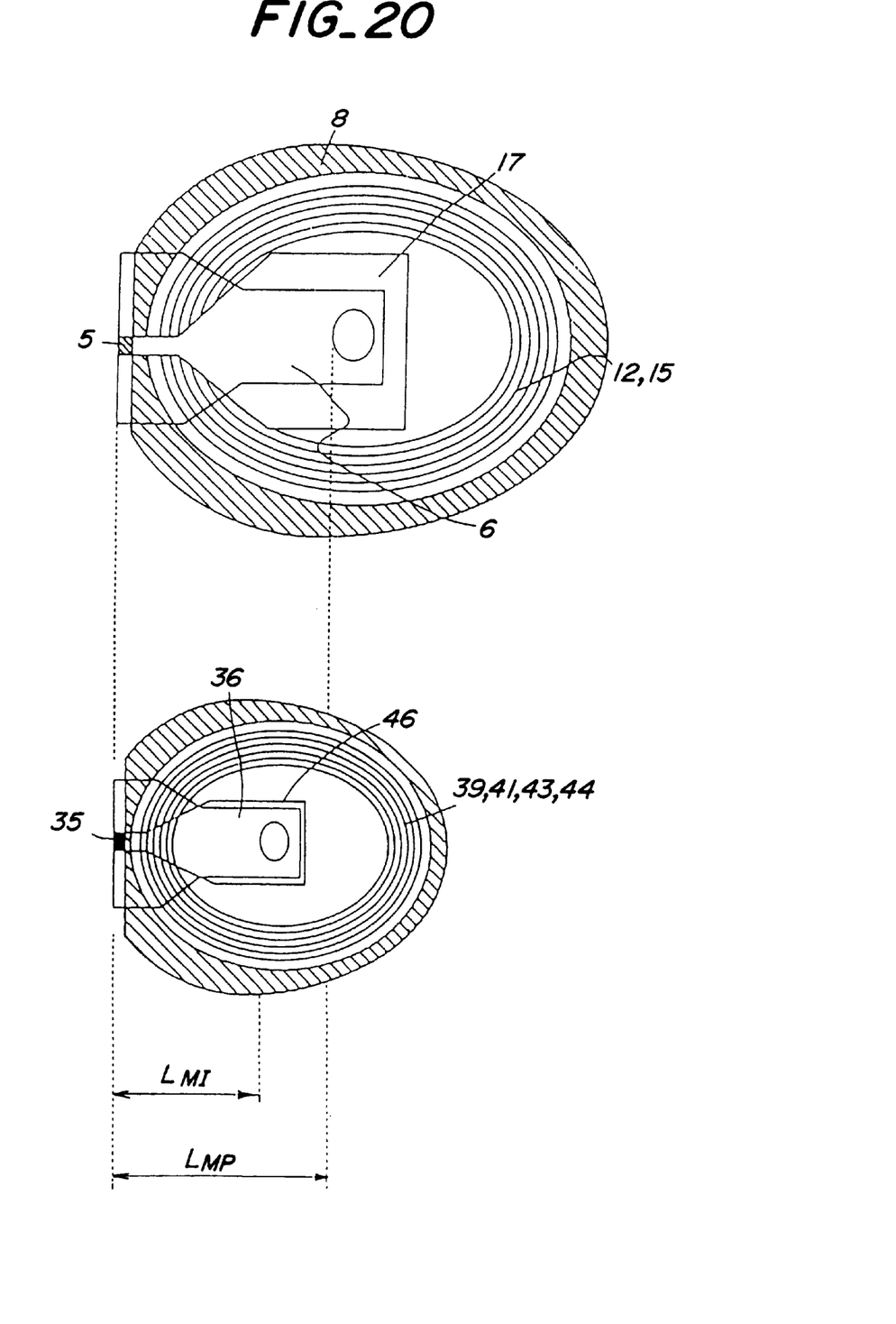
FIG. 20 is a schematic plan view illustrating a magnetic path length of the thin film magnetic head according to the invention in comparison with that of the known thin film magnetic head.

FIG. 20 is a schematic plan view showing the magnetic path length of the thin film magnetic head according to the invention in comparison with that of the known thin film magnetic head. According to the invention, although a width of the coil winding of the thin film coil is identical with that of the known thin film magnetic head, a spacing between successive coil windings can be 0.8–1.5 μm which is smaller than that of the known thin film magnetic head having a spacing of about 2 μm. Therefore, the magnetic path length $L_{MI}$ of the thin film magnetic head according to the invention can be extremely reduced to about 60–75% of the magnetic path length $L_{MP}$ of the known thin film magnetic head. Then, the magnetic flux rising time, NLTS and overwrite characteristics can be improved by shortening the magnetic path length.

The present invention is not limited to the above mentioned embodiment, but many alternations and modifications may be considered within the scope of the invention. For instance, in the above embodiment, there are provided two layers in the thin film coil, but one thin film coil layer or more than two thin film coil layers may be provided. According to the present invention, since the number of coil windings can be increased, it is almost unnecessary to provide more than three thin film coil layers.

Further, in the above embodiment, the seed layers 39, 43 are made of Ti—TiN, but it may be made of any material which can be easily removed by the reactive ion etching such as Mo, W, Al, Ti—TiW, $MoSi_2$ and $WSi_2$. In the above embodiment, the seed layer is removed by the reactive ion etching using a fluorine gas, but according to the invention, the reactive ion etching using a chlorine gas such as $Cl_2$ may be used to remove the seed layer.

Moreover, in the above embodiment, the seed layer is formed by a single layer, but according to the invention, the seed layer may be formed by a two layer structure including a seed layer body made of the above mentioned material such as Ti—TiN, Mo, W, Al, Ti—TiW, $MoSi_2$ and $WSi_2$ and a very thin copper layer formed on said seed layer body with a thickness of several tens nm. By using such a seed layer having the copper layer at its surface, the copper layer deposited by the electroplating can be formed to have a uniform thickness and can be prevented from being pealed off the seed layer. In case of removing the seed layer having the very thin copper layer formed in its surface, at first the copper layer is removed by the sputter etching using an argon gas, and then the seed layer body is removed by the reactive ion etching using the above mentioned fluorine or chlorine gas.

Furthermore, in the above embodiment, the thin film magnetic head is constructed as a normal type combination type thin film magnetic head in which the magnetoresistive type reading thin film magnetic head is formed on the substrate and then the inductive type writing thin film magnetic head is formed on the magnetoresistive type thin film magnetic head. However, according to the invention, the thin film magnetic head may be constructed as a reversed type combination type thin film magnetic head in which the up and down relationship between the magnetoresistive type thin film magnetic head and the inductive type thin film magnetic head is reversed. Moreover, it is not always necessary to construct the thin film magnetic head according to the invention into the combination type, but only the inductive type thin film magnetic head may be formed on the substrate.

In the above embodiment, the magnetoresistive element constituting the magnetoresistive type thin film magnetic head is formed by the GMR element, but it may be formed by an AMR element.

In the thin film magnetic head according to the invention, since a spacing between successive coil windings of the thin film coil can be smaller than 1.5 μm, and can be set to 0.8–1.5 μm smaller than that of the known thin film magnetic head, the magnetic path length can be shortened to improve characteristics such as flux rise time, NLTS and over write properties. Moreover, since a spacing between successive coil windings can be shortened, the number of coil windings per one thin film coil layer can be increased and particularly the NLTS property can be improved.

Moreover, according to the invention, the retardation of the edge position of the photoresist pattern during the removal of seed layer by the ion beam etching in the conventional method can be avoided, and thus the throat height zero position could never be shifted during the manufacturing process. Therefore, it is possible to obtain the thin film magnetic head having the throat height which is accurately identical with a designed value, and a manufacturing yield can be improved.

What is claimed is:

1. A thin film magnetic head comprising:

a first magnetic layer having a pole portion which is to be opposed to a magnetic record medium;

a second magnetic layer having a pole portion which constitutes an air bearing surface together with said pole portion of the first magnetic layer and being magnetically coupled with said first magnetic layer at a portion remote from the air bearing surface;

a write gap layer made of a non-magnetic material and being interposed at least between said pole portion of the first magnetic layer and said pole portion of the second magnetic layer;

a thin film coil consisting of one or more thin film coil layers and having a portion which is arranged between said first and second magnetic layers in an electrically insulated and isolated manner; and a substrate supporting said first and second magnetic layers, gap layer and thin film coil;

wherein a coil winding of said thin film coil includes an electroplating seed layer made of a material selected from the group consisting of Ti—TiN, Al, Ti—TiW, $MoSi_2$ and WSi and shaped by a reactive ion etching, and a coil body made of an electrically conductive material deposited by electroplating on a surface of said seed layer remote from the substrate.

2. A thin film magnetic head according to claim 1, wherein said electrically conductive material forming the coil body of the coil windings is copper.

3. A thin film magnetic head according to claim 2, wherein said seed layer constituting said coil windings of the thin film coil is consisting of a seed layer body made of a material selected from the group consisting of Ti—TiN, Mo, W, Al, Ti—TiW, $MoSi_2$ and $WSi_2$, and a copper layer formed on a surface of said seed layer body remote from said substrate and having a thickness smaller than that of the seed layer body, whereby said electrically conductive material constituting said coil body of the coil windings is made of a copper.

4. A thin film magnetic head according to claim 3, wherein said seed layer body has a thickness of 0.05–0.1 μm, and said copper layer has a thickness of several tens nanometers.

5. A thin film magnetic head according to claim 1, wherein a spacing between successive coil windings of the thin film coil is shorter than 1.5 μm.

6. A thin film magnetic head according to claim 4, wherein a spacing between successive coil windings of the thin film coil is 0.8–1.5 μm.

7. A thin film magnetic head according to claim 6, wherein said coil windings have a height of 2–3 μm and a width of 1.5–2.0 μm.

8. A thin film magnetic head according to claim 1, wherein said electrically conductive material deposited within a magnetoresistive type thin film magnetic head including a magnetoresistive element embedded in a shield gap layer is provided to be supported by said substrate.

9. A thin film magnetic head according to claim 8, wherein said magnetoresistive type thin film magnetic head is arranged between the substrate and the first magnetic layer.

* * * * *